United States Patent [19]

Akao

[11] Patent Number: 4,844,961
[45] Date of Patent: Jul. 4, 1989

[54] CONTAINER FOR PHOTOGRAPHIC FILM CARTRIDGE

[75] Inventor: Mutsuo Akao, Kanagawa, Japan

[73] Assignee: Fuji Photo Film Co., Ltd., Minami-Ashigara, Japan

[21] Appl. No.: 111,025

[22] Filed: Oct. 21, 1987

[30] Foreign Application Priority Data

Oct. 30, 1986 [JP] Japan .................. 61-256831

[51] Int. Cl.$^4$ .............................................. B27N 5/02
[52] U.S. Cl. .................. 428/36.92; 206/455; 206/407; 524/580; 524/585
[58] Field of Search ................ 206/316, 407; 524/580, 524/585; 428/35, 36–42

[56] References Cited

U.S. PATENT DOCUMENTS

| | | | |
|---|---|---|---|
| 3,455,863 | 7/1969 | Williams . | |
| 4,117,193 | 9/1978 | Tsuchiya et al. | 428/516 |
| 4,485,217 | 11/1984 | Bunter et al. | 525/240 |
| 4,525,257 | 6/1985 | Kurtz et al. | 525/222 |
| 4,639,386 | 1/1987 | Akao | 428/35 |
| 4,738,942 | 4/1988 | Nowlin | 526/124 |

FOREIGN PATENT DOCUMENTS

740031 8/1966 Canada .

OTHER PUBLICATIONS

Patent Abstracts of Japan, vol. 6, No. 135 (C-115), Jul. 22, 1982.
R. Gachter et al., "Taschenbuch der Kunststoff-Additive", 1979, pp. 252–253.
Patent Abstracts of Japan, vol. 4, No. 16 (C-72), Feb. 7, 1980, p. 24 C 72.

Primary Examiner—Jose G. Dees
Assistant Examiner—James J. Seidleck
Attorney, Agent, or Firm—Burns, Doane, Swecker & Mathis

[57] ABSTRACT

In a container for a photographic film cartridge having a body and a cap made of a high-pressure branched low-density polyethylene resin and fitted to said body, the improvement comprising that said polyethylene resin has a melt index of 10 to 50 g/10 minutes, a density of 0.920 to 0.935 g/cm$^3$ and a molecular weight distribution of 3.3 to 8.5 and contains 0.01 to 0.9 wt. % of a lubricant.

This resin for the cap is excellent in fluidity, mold shrinkage, moldability, etc., and molding troubles and coloring troubles at molding remarkably decrease. The molding cycle is also shortened. The resin is particularly suitable for molding using a mold for many pieces at once.

7 Claims, 3 Drawing Sheets

CONTAINER FOR PHOTOGRAPHIC FILM CARTRIDGE

BACKGROUND OF THE INVENTION

1. Field of the Invention

This invention relates to a container for a photographic film cartridge which is characterized by the composition of its cap.

2. Description of the Prior Art

A conventional cap of the container for the photographic film cartridge was usually made of high-pressure branched low-density polyethylene (LDPE) resin having 0.927 g/cm$^3$ in density (ASTM D 1505) and 4.0 g/10 minutes in melt index (ASTM D 1238, at 190° C., MI). This resin is superior in flexibility at a low temperature, fitness of cap and body, compressive strength, a few burrs and gate marks.

However, in the case of using the LDPE resin, molding troubles, such as a short shot of the molten resin, warp, twist and deformation, frequently occur. Its insufficient heat stability was also a problem. That is, the LDPE resin staying in a continuous molding machine at its screw, manifold, hot runner or other places was gradually colored brown or dark brown by heat. This colored resin was gradually extruded to cause coloring troubles. The generation rate of the colored products was high, such as 3 to 10%, and these products should be extracted by a checker or a checking machine. A more important problem was that when coloring troubles happened, the molding machine must be disassembled and washed to remove the colored resin completely. Much effort and a long time were spent for this cleaning work. As another problem, since the fluidity of the LDPE resin was not sufficient because of its low MI, its temperature should be high at molding. As a result, molding cycle became lengthy.

In order to solve the coloring problem, when the cap was colored by blending carbon black, not only did the appearance of the container became unfavorable but also the manufacturing cost became elevated. Furthermore, when the whole container was colored black, the inside of the container became hot in the sunshine. This caused degradation of the photographic film in the container.

A metal container is also known (e.g. Japanese Utility Model KOKOKU No. 58-46413). However, the metal container was expensive, and its mass-producibility was inferior compared to a plastic container. Accordingly, it is not now utilized.

SUMMARY OF THE INVENTION

An object of the invention is to provide a container for a photographic film cartridge having a cap which is produced without coloring troubles or molding troubles.

Another object of the invention is to provide a container for a photographic film cartridge having a cap which is made of a resin that is excellent in fluidity in the molten state and thereby capable of lowering the molding temperature.

Another object of the invention is to provide a container for a photographic film cartridge having a cap which is made of a resin having a small mold shrinkage.

Still another object of the invention is to provide a container for a photographic film cartridge having a cap which can be made transparent or translucent and thereby the foregoing the problems in the sunshine can be solved.

Such objects are achieved by a cap containing a particular polyethylene resin having a fluidity of more than 2.5 times that of the conventional LDPE resin and a lubricant blended therewith.

DETAILED DESCRIPTION OF THE INVENTION

Figure 1:
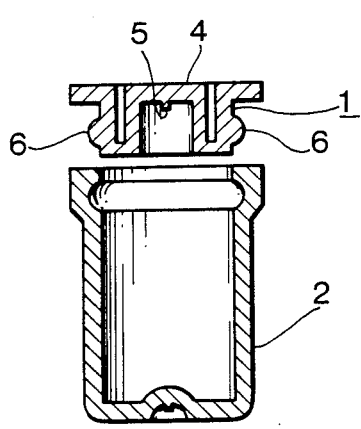
FIGS. 1 to 4 are sectional side views indicating several examples of the container to which the present invention is applied.
Figure 2:
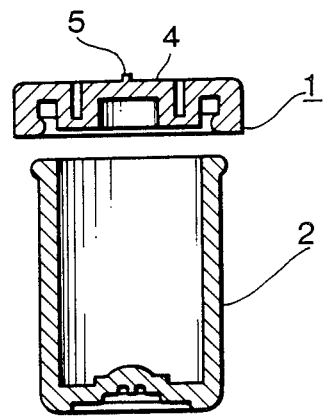

The cap of the invention is composed of a particular high-pressure branched low-density polyethylene (LDPE) resin characterized by a defined melt index, density, and molecular weight distribution and the presence of lubricant.

The melt index (MI) of the LDPE resin is 10 to 50 g/10 minutes, preferably 18 to 35 g/10 minutes. In the case of a melt index lower than 10 g/10 minutes, the fluidity of the molten resin becomes worse, and molding troubles, such as warp, twist and short shot, happen. The molding cycle is also lengthened. In order to improve moldability, the molding temperature should be raised. As a result, coloring troubles frequently happen, and resin remaining at the mold gate also become a problem. Power consumption increases, and molding cycle is lengthened because of a lengthening of the cooling time. On the other hand, in the case of higher than 50 g/10 minutes, the resin is too plastic, and molding troubles such as a collapse of the rib of cap, ejection troubles, stringiness, resin residue at the gate and the presence of burrs frequently happen.

The density of the LDPE resin is 0.920 to 0.935 g/cm$^3$. In the case of a density lower than 0.920 g/cm$^3$, heat resistance is inferior, and coloring troubles happen. Besides, the resin is too plastic, and deformation of the rib of the cap to be fitted into the groove of container body happens when the cap is taken out from its mold. Moreover, the fitting strength of the cap to the container body is weak, and therefore, sealability and moistureproofness become insufficient so as to allow degradation of the photographic film packaged in it. While, in the case of higher than 0.935 g/cm$^3$, the resin becomes too rigid, and the fittability of cap to body becomes worse. As a result, the cap is liable to detach if the container is dropped, and moisture permeability becomes too high.

The molecular weight distribution of the LDPE resin is 3.3 to 8.5 (weight average molecular weight $\overline{M}w$/number average molecular weight $\overline{M}n$ by the GPC method). The LDPE resin having this molecular weight distribution is excellent in moldability, and its dimensional variation according to the molding process is small, irrespective of the manufacturing process such as the autoclave method or tubular method. In the case of a molecular weight distribution less than 3.3, injection moldability becomes worse, and short shot occurs even though the MI of the resin is high. Since other molding troubles also increase, high speed injection molding in the case of more than 12 cavities is difficult.

While, in the case of a molecular weight distribution more than 8.5, mold shrinkage is different according to the cooling period, and the size of the molded cap varies widely. Particularly, when the cooling period is shortened, mold shrinkage becomes large to produce off-specification products.

The manufacturing method of the LDPE resin is not limited. However, LDPE resin manufactured by autoclave method is preferable. Commercial LDPE resins are "SUMIKATHENE" (SUMITOMO CHEMICAL CO., LTD.). "MITSUBISHI POLYETHY" (MITSUBISHI PETROCHEMICAL CO., LTD.), "MIRASON" (MITSUI POLYCHEMICALS CO., LTD.), "NUC POLYETHYLENE" (NIPPON UNICAR CO., LTD.), "UBE POLYETHYLENE" (UBE INDUSTRIES LTD.), "NIPOLON" (TOYO SODA MANUFACTURING CO., LTD.), "SHOLEX" (SHOWA DENKO K.K.), "NOVATEC-L" (MITSUBISHI CHEMICAL INDUSTRIES LTD.), "SUNTEC-LD" (ASAHI CHEMICAL INDUSTRIES CO., LTD.), etc.

The resin composing the cap may contain other thermoplastic resin(s) blendable with the LDPE resin. Even in such as case, the content of the LDPE resin must be more than 50 wt. % of the cap. A particularly suitable thermoplastic resin for blending with the LDPE resin is low-pressure linear low-density polyethylene (L-LDPE) resin which is a copolymer of ethylene and α-olefin, and the L-LDPE resin of which α-olefin is butene-1 is particularly preferable.

The lubricant not only improves injection of the LDPE resin into the mold and removing the cap from the mold but also improves the fittability of the cap to the body. It also makes detachment of the cap easy, and the cap is not deformed upon detachment. The content of the lubricant is 0.01 to 0.9 wt. %, preferably 0.1 to 0.5 wt. %. When the content is less than 0.01 wt. %, moldability becomes bad. While, when the content is more than 0.9 wt. %, the cap becomes sticky, and thereby, the molding cycle is elongated. Pelletizing is also a problem. In some cases, plasticization of the resin becomes difficult. Suitable lubricants are fatty acid amide lubricants, particular silicone lubricants, alkylamine lubricants and the like, and in the case of uncolored natural LDPE resin, fatty acid amide lubricants are preferable. Bleeding out of these lubricants is slow, and they do not adversely affect the photographic film placed in the container. Examples of commercial lubricants suitable for the present invention include:

Oleic acid amide lubricants; "ARMOSLIP-CP" (Lion akzo Co., Ltd.), "NEWTRON" and "NEWTRON E-18" (Nippon Fine Chemical Co., Ltd.), "AMIDE-0" (Nitto Kagaku K.K.), "DIAMID 0-200" and "DIAMID G-200" (Nippon Kasei Chemical Co., Ltd.), "ALFLOW E-10" (Nippon Oil and Fats Co., Ltd.)

Erucic acid amide lubricants; "ALFLOW P-10" (Nippon Oil and Fats Co., Ltd.)

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.)

Bis fatty acid amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.)

Silicone lubricants; Dimethylpolysiloxanes, carboxyl-modified dimethylpolysiloxanes, etc. (Shinetsu Chemical Co., Ltd., Toray Silicone Co., Ltd., Nippon Unicar Co., Ltd., Dow Corning, etc.)

Alkylamine lubricants; "ELECTROSTRIPPER TS-2" (Kao Corp.)

An oxidation inhibitor is preferably blended in order to prevent coloring of the resin, when resin temperature is raised to improve fluidity. Most of the coloring trouble can be removed by the synergistic effect of the addition of oxidation inhibitor and lowering of the resin temperature caused by the LDPE resin. Preferably oxidation inhibitors are phenol oxidation inhibitors and phosphite oxidation inhibitors. However, other oxidation inhibitors capable of preventing coloring trouble without exerting an adverse influence upon the photographic film may also be utilized. A suitable content of the oxidation inhibitor is 0.01 to 1.5 wt. %, preferably 0.03 to 0.3 wt. %. When the content is less than 0.01 wt. %, the blending effect becomes insufficient. While, when the content is more than 1.5 wt. %, it adversely affects the photographic film utilizing oxidation-reduction reaction, such as fogging or lowering of sensitivity. In this regard, the content is preferably less. The phenol oxidation inhibitors include n-octadecyl-3-(3′,5′-di-t-butyl-4′-hydroxyphenyl)propionate, 2,6-di-t-butyl-4-methylphenol, 2,6-di-t-butyl-p-cresol, 2,2′-methylenebis(4-methyl-6-t-butylphenol), 4,4-thiobis(3-methyl-6-t-butylphenol), 4,4′-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene and tetrakis[methylene-3-(3′,5′-di-t-butyl-4′-hydroxyphenyl)propionate]methane. The phosphorus-containing oxidation inhibitor includes trinonylphenylphosphite and triphenylphosphite. Commercial products belonging to the phenol oxidation inhibitors include various "IRGANOX" (CIBA-GEIGY AG) and "SUMILIZER BHT", "SUMILIZER BP-76", "SUMILIZER WX-R" and "SUMILIZER BP-101" (SUMITOMO CHEMICAL CO., LTD.). The phosphite oxidation inhibitors include trinonylphenylphosphite and triphenylphosphite. Two or more oxidation inhibitors may be combined.

The bending rigidity of the cap is preferably 1,200 to 4,000 kg/cm$^2$ (ASTM D-747) in view of injection moldability, such as removal from the mold, sufficient stiffness so as not to collapse, the fittability to the container body and sealability. The bending rigidity of the cap is preferably less than one half of the bending rigidity of the container body in view of the fittability to the container body.

A coloring material may be blended, if necessary. As the coloring material, dye, pigment, metal powder, metal fiber and metal flake are usable. Examples of the coloring material are as follows:

White coloring material; Titanium oxide, calcium Carbonate, mica, zinc oxide, clay, barium sulfate, calcium sulfate, magnesium silicate, etc.

Yellow coloring material; Titanium yellow, yellow iron oxide, chrome titanium yellow, diazo pigment, isoindolenone, etc.

Red coloring material; Red iron oxide, diazo pigment, berlin pigment, monoazo lake pigment, condensed azo pigment, etc.

Blue coloring material; Cobalt blue, ultramarine, Cyanine Blue, etc.

Green coloring material; Chromium oxide green, titanium green, Cyanine Green, etc.

Black coloring material; Carbon black, black iron oxide, etc.

Silver coloring material; Aluminum powder, aluminum paste, tin powder, etc.

Among them, silver coloring material and carbon black is preferable because of shielding of coloring trouble. In addition, carbon black has a synergistically antioxidative effect. Silver coloring material reflects sun light to prevent temperature rise, and it also brings a favorable appearance. Content of coloring material is preferably less than 3 wt. %, such as 0.1 to 1 wt. %.

Various additives in addition to the mentioned previously may be added to the resin for cap. Examples of the additives are described below.

(1) Plasticizer; phthalic acid ester, glycol esters, fatty acid esters, phosphoric acid esters, etc.

(2) Stabilizer; lead compounds, cadmium compounds, zinc compounds, alkaline earth metal compounds, organic tin compounds, etc.

(3) Antistatic agent; cationic surfactants, anionic surfactants, nonionic surfactants, ampholytic surfactants, etc.

(4) Flame retardant; phosphoric acid esters, phosphoric acid ester halides, halides, inorganic materials, polyols containing phosphorous, etc.

(5) Filler; alumina, kaolin, clay, calcium carbonate, mica, talc, titanium oxide, silica, etc.

(6) Reinforcing agent; glass lobing, metallic fiber, glass fiber, glass milled fiber, carbon fiber, etc.

(7) Nucleating agent; inorganic nucleating agent, organic nucleating agents (such as dibenzylidenesorbitol)

(8) Vulcanizing agent; vulcanization accelerator, acceleration assistant, etc.

(9) Deterioration preventing agent; ultraviolet absorber, metal deactivator, peroxide decomposing agent, etc.

(10) Coupling agent; silane compounds, titanium compounds, chromium compounds, aluminum compounds, etc.

(11) Various thermoplastic resins, rubbers. Particularly, polyolefin thermoplastic resins are preferable.

Figure 3:
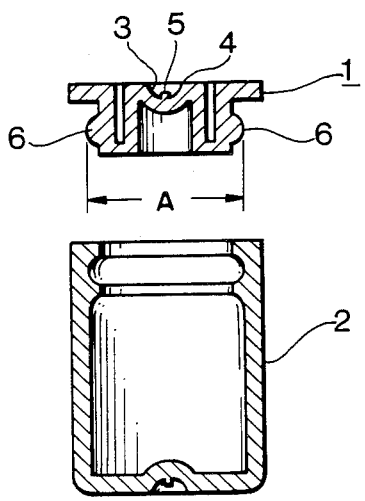
Figure 4:
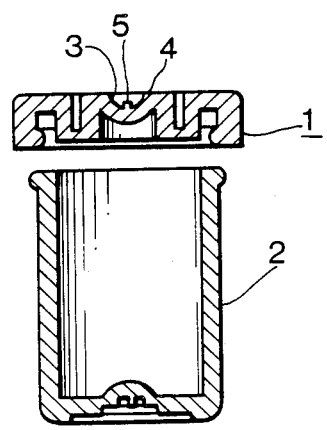
Figure 5:
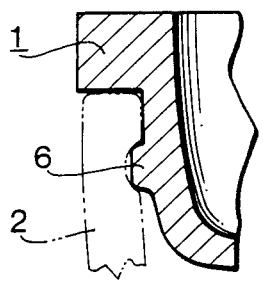
FIGS. 5 to 9 are partial sectional views indicating the fitting structure of some other caps to which the present invention is applied.
Figure 6:
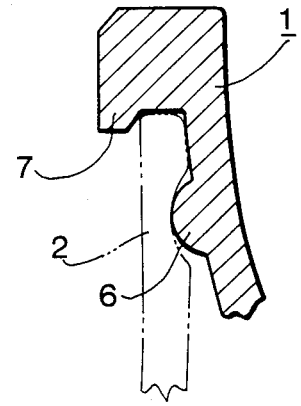
Figure 7:
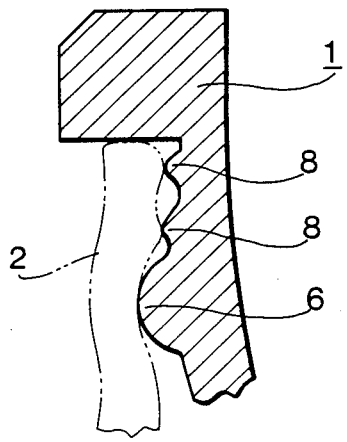
Figure 8:
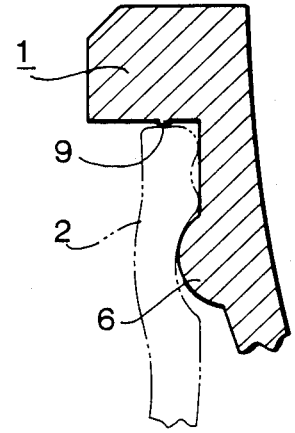
Figure 9:
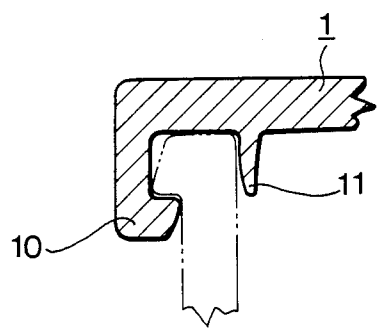

The cap of the invention is a fitting type. Its form is not limited. However, the caps in FIGS. 1 and 3 are preferable in view of good fitness to the body of the container to bring sufficient seal and readiness of detachment. In the drawings, 1 represents the cap, 2 represents the container body, 4 represents the gate portion to inject molten resin into the mold cavity, 5 represents the gate mark and 6 the represents rib. Particularly, the caps of FIGS. 1 and 3 are preferable because it can be detached by one hand. As shown in FIGS. 3 and 4, an indent 3 may be formed around a gate mark 5, and the gate mark 5 is provided in it so as not to project out. This structure is preferable in points of appearance and molding. Since the gate mark 5 does not project out, its after-treatment is not necessary. Stringiness trouble also decreases. As shown in FIG. 5, the top of the rib 6 may be cut off, and as shown in FIG. 6, an engaging edge 7 may be formed. Besides, as shown in FIG. 7, one or more projecting rings 8 may be formed above the rib 6, and as shown in FIG. 8, a projecting ring 9 may be formed on the reverse face of the flange of the cap to touch the upper edge of the container body. In addition, as shown in FIG. 9, the lower end of the skirt portion is projected into the inside of the cap so as to form an engaging portion 10, and a grasping ring piece 11 may be provided so as to grasp the upper edge of the container body from the inside.

Figure 10:
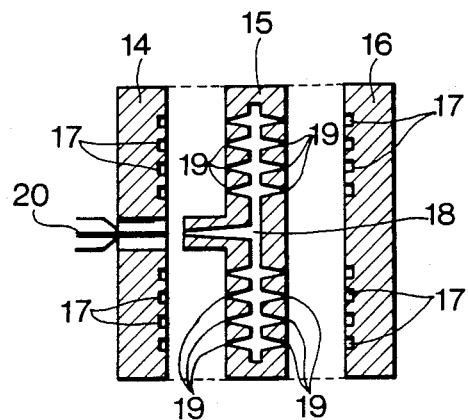
FIG. 10 is a sectional view of a mold for stack molding.

The molding method of the cap is not limited, and the cap may be produced by hot runner type injection molding, inter mold vacuum injection molding or stack molding. However, the resin of the invention is effective in the case of single mold molding many products such as more than 20 products at once, and it is further effective in the case of using a stack mold (double mold) having cavities on both sides of the mold, as shown in FIG. 10. This mold comprises a stationary mold 14, an intermediate plate 15 and a moving mold 16. 12 cavities (not limited to this number) are formed in both of the stationary mold 14 and the moving mold 16, respectively. The intermediate plate 15 is provided with a manifold 18, and gates 19 are formed at each manifold position corresponding to the cavities 17 of the stationary mold 14 and the moving mold 16. 20 indicates an injection tube.

Since the cap of a container for a photographic film cartridge of the invention is composed of a particular LDPE resin having a high MI, a suitable density and a small molecular weight distribution and a prescribed amount of a lubricant blended thereto, the fluidity of the resin is more than 2.5 times that of the conventional resin. Since its melt viscosity is low even at a low temperature, the molten resin smoothly flows in a molding machine without staying in the screw or other portions. Accordingly, coloring trouble hardly occurs. Since the mold shrinkage of this resin is small, the cooling period at molding can be shortened. As a result, the molding cycle can also be shortened because of the low temperature and fast cooling. Since the moldability of the resin is excellent, molding troubles such as warp, stringiness, weld line, bottom sink mark and short shot hardly occur even at a low temperature. Particularly in the case of using the mold for molding many products such as more than 24 products at once, uniform products can be obtained because of the decrease in the difference of cooling efficiency caused by the position of cavity and the decrease in flow variation caused by a slight difference in resin temperature, gate diameter or the like. Moreover, in the case of stack molding capable of molding more than 16 products per one mold at once, the flow rate of the molten resin can easily be balanced between the stationary mold and the moving mold, and burr and short shot do not occur. Thus, the caps molded are uniform, and the dimensional variation among the products from respective cavities is very small.

EXAMPLES

Three examples of the cap of the invention, two comparative caps and one conventional cap were molded using the molding machine "IS 75E" (manufactured by TOSHIBA MACHINE CO., LTD.) at a mold clamping pressure of 75 t. The molding number per cycle was 2, and the type of runner was a hot runner.

The cap for a photographic film cartridge container of Example 1 was molded by injection molding using the LDPE resin having a MI of 35 g/10 minutes, a density of 0.924 g/cm$^3$ and a molecular weight distribution of 5.24 blended with 0.3 wt. % of oleic acid amide lubricant ("ARMOSLIP CP", LION AKZO CO., LTD.).

The cap for a photographic film cartridge container of Example 2 was molded by injection molding using a LDPE resin having a MI of 25 g/10 minutes, a density of 0.926 g/cm$^3$ and a molecular weight distribution of 3.76 blended with the same amount of the same lubricant as Example 1.

The cap for a photographic film cartridge container of Example 3 was molded by injection molding using a LDPE resin having a MI of 18 g/10 minutes, a density of 0.926 g/cm³ and a molecular weight distribution of 4.22 blended with the same amount of the same lubricant as Example 1.

Comparative cap 1 was molded by injection molding using a LDPE resin having a MI of 16 g/10 minutes, a density of 0.926 g/cm³ and a molecular weight distribution of 3.08 blended with the same amount of the same lubricant as Example 1.

Comparative cap 2 was molded by injection molding using the same LDPE resin as Example 1 but without a lubricant.

A conventional cap was molded by injection molding a LDPE resin having a MI of 4 g/10 minutes, a density of 0.927 g/cm³ and a molecular weight distribution of 9.21 blended with 0.03 wt. % of the same lubricant as Example 1.

The shapes of the above six caps were the same as shown in FIG. 3. The container body was composed of propylene-ethylene random copolymer resin, and its shape was the same as shown in FIG. 3.

Various properties of the molded caps are shown in Table 1.

TABLE 1

|  | Unit | Invention 1 | Invention 2 | Invention 3 | Comparative 1 | Comparative 2 | Conventional |
| --- | --- | --- | --- | --- | --- | --- | --- |
| MI | g/10 min. | 35 | 25 | 18 | 16 | 35 | 4 |
| Density | g/cm³ | 0.924 | 0.926 | 0.926 | 0.926 | 0.924 | 0.927 |
| M.W. Distribution |  | 5.24 | 3.76 | 4.22 | 3.08 | 5.24 | 9.21 |
| Lubricant Content | wt. % | 0.3 | 0.3 | 0.3 | 0.3 | — | 0.03 |
| Minimum Cycle Time | sec. | 4.5 | 4.5 | 4.7 | 5.8 | 10.3 | 8.0 |
| Injection Pressure | kg/cm² | 70 | 80 | 85 | 93 | 82 | 118 |
| Mold Shrinkage | % | 0.20 | 0.18 | 0.21 | 0.24 | Difficult to mold | 0.48 |
| Cap Detachment | — | B | A | A | A | Difficult to mold | D |
| Fitting Strength | kg | 1.62 | 1.82 | 1.73 | 1.87 | Difficult to mold | 1.17 |
| Moisture Permeability | mg/24 hrs. | 2.4 | 1.7 | 2.1 | 1.6 | Difficult to mold | 4.3 |
| Optimum Molding Temperature | °C. | 158 | 163 | 172 | 205 | Difficult to mold | 215 |
| Coloring Trouble | — | A | A | B | E | Difficult to mold | E |
| Molding Trouble | — | A | A | A | E | Difficult to mold | D |
| Dimensional Variation | — | B | A | A | B | Difficult to mold | E |

Testing methods are as follows:
Melt Index; ASTM D-1238 (at 190° C.)
Density; ASTM D-1505
Molecular Weight Distribution; Each LDPE resin was dissolved in o-dichlorobenzene in a concentration of 3 mg/ml, and measured by gel permeation chromatography at 135° C.
Minimum Cycle Time; The shortest time of one shot of injection-cooling-taking out capable of obtaining conforming articles.
Injection Pressure; Actual values indicated
Mold Shrinkage; The shrinkage of A indicated in FIG. 3 at the time when cooling time was shortened 1 second by shortening molding cycle time from 7 seconds to 6 seconds.

$$\frac{\left(\begin{array}{c}\text{Rib diameter}\\\text{at 7 sec.}\end{array}\right) - \left(\begin{array}{c}\text{Rib diameter}\\\text{at 6 sec.}\end{array}\right)}{\text{Rib diameter at 7 sec.}} \times 100$$

Cap Detachment; Measured by using each cap molded at a cycle time of 6 seconds. A photographic film cartridge containing a photographic film of 36 exposures ("Fuji Color HR-100", 36 Ex.) was placed in each container. Each container was dropped from 5 meters height to concrete floor, and the number of cap-detached containers were counted. In order to avoid the detachment of cap caused by breaking of the container body, the container body was made of polypropylene resin containing polyethylene in a high content.
Fitting strength; Measured by using each cap molded at a cycle time of 6 seconds. A spring balance was provided with a grip member. Each cap was grasped by the grip member, and the spring balance was pulled in the upward direction. The force necessary to detach each cap was measured.
Moisture Permeability; Measured by using cap molded at a cycle time of 6 seconds. About 4 g of calcium chloride was exactly weighted, and placed in each container. Each cap was attached, and the container was allowed to stand in a room controlled at 40° C. and 90% in humidity for 24 hours. Increase in the weight of calcium chloride was exactly weighed by a precision balance, and the increase in weight was employed as moisture permeability.
Optimum Molding Temperature; The resin temperature at the optimal molding condition for each resin where molding trouble hardly occurs, in the case of using a stack mold for molding 48 pieces at once.
Coloring Trouble; Coloring degree of the product produced continuously using a stack mold for molding 48 pieces at once at the optimal temperature for each resin where molding trouble hardly occurs.
Molding Trouble; Occurrence of molding trouble such as warp, bottom sink mark, short shot and burr at the optimal molding condition for each resin, in the case of using a stack mold for molding 48 pieces at once.

Dimensional Variation; Dimensional variation among the molded products of each cavities, in the case of using a stack mold for molding 48 pieces at once.

In the above test methods of optimum molding temperature, coloring trouble, molding trouble and dimensional variation, the molding was carried out using the molding machine "NESTAL" (SUMITOMO HEAVY INDUSTRIES LTD.) at a mold clamping pressure of 150 t. The type of runner was a hot runner. The mold employed was as shown in FIG. 10, and 48 pieces of the cap were molded at one shot. That is, 24 pieces were molded by the stationary mold 14 and the remaining 24 pieces were molded by the moving mold 16.

I claim:

1. In a container for a photographic film cartridge having a body and a cap, said cap being fitted to said body and said cap being comprised of a high-pressure branched low-density polyethylene resin, the improvement comprising that said polyethylene resin of said cap has a melt index of 10 to 50 g/10 minutes, a density of 0.920 to 0.935 g/cm$^3$ and a molecular weight distribution of 3.3 to 8.5 and contains 0.01 to 0.9 wt. % of a lubricant.

2. The container claim 1 wherein said lubricant is selected from the group consisting of oleic acid amide lubricant, erucic acid amide lubricant, stearic acid amide lubricant and bis fatty acid amide lubricant.

3. The container of claim 1 wherein said polyethylene resin further contains 0.01 to 1.5 wt. % of at least one of a phenol oxidation inhibitor and a phosphite oxidation inhibitor.

4. The container of claim 1 wherein said polyethylene resin further contains a coloring material.

5. The container of claim 1 wherein the content of said polyethylene resin is more than 50 wt. %, and further contains a low-pressure linear low-density polyethylene resin.

6. The container of claim 1 of which not less than 24 pieces are produced at one molding.

7. The container of claim 1 which is produced by stack molding.

* * * * *